United States Patent [19]
Walker et al.

[11] Patent Number: 5,845,933
[45] Date of Patent: Dec. 8, 1998

[54] AIRBAG INFLATOR WITH CONSUMABLE IGNITER TUBE

[75] Inventors: Kerry C. Walker, Ogden; Scott A. Jackson, Centerville; Brian H. Fulmer, Farr West, all of Utah

[73] Assignee: Autoliv ASP, Inc., Ogden, Utah

[21] Appl. No.: 773,457

[22] Filed: Dec. 24, 1996

[51] Int. Cl.⁶ .................................................. B60R 21/28
[52] U.S. Cl. ........................... 280/741; 280/736; 422/165
[58] Field of Search .................................... 280/741, 736, 280/728.1; 422/165, 166

[56] References Cited

U.S. PATENT DOCUMENTS

| | | | |
|---|---|---|---|
| 2,430,888 | 11/1947 | Regad et al. | 102/86.5 |
| 3,828,676 | 8/1974 | Junker | 102/39 |
| 3,929,074 | 12/1975 | San Miguel | 102/38 |
| 4,005,876 | 2/1977 | Jorgensen et al. | 280/741 |
| 4,200,615 | 4/1980 | Hamilton et al. | 422/166 |
| 4,358,998 | 11/1982 | Schneiter et al. | 102/530 |
| 4,878,690 | 11/1989 | Cunningham | 280/741 |
| 4,890,860 | 1/1990 | Schneiter | 280/741 |
| 4,901,642 | 2/1990 | White et al. | 102/202 |
| 5,113,763 | 5/1992 | Schoeyer et al. | 102/202 |
| 5,441,705 | 8/1995 | Lauritzen et al. | 422/166 |
| 5,623,115 | 4/1997 | Lauritzen et al. | 280/741 |
| 5,626,360 | 5/1997 | Lauritzen et al. | 280/741 |

FOREIGN PATENT DOCUMENTS

| | | |
|---|---|---|
| 0728632 | 8/1996 | European Pat. Off. . |
| 3932576 | 4/1991 | Germany . |
| 1036396 | 7/1966 | United Kingdom . |
| 1263574 | 2/1972 | United Kingdom . |

*Primary Examiner*—Christopher P. Ellis
*Attorney, Agent, or Firm*—Sally J. Brown

[57] ABSTRACT

A consumable igniter tube for a solid fuel passenger side airbag inflator is provided. The igniter tube is composed of a thin metallic material, such as aluminum foil, that has it walls being at least partially, and preferably essentially fully devoured, almost instantaneously upon ignition of the primary igniter charge that is initially confined within the tube. The entire combustion products produced from the burning igniter charge, including hot gases as well as hot burning particulates, are thereby released through the openings created in the consumed igniter tube walls and vented into the adjacent combustion chamber that contains the solid fuel gas generant. All of the burning igniter products are thus used to ignite the solid fuel gas generant, which, upon ignition, generates inflation gases that eventually exit the inflator into a folded airbag in order to inflate and deploy the airbag into the passenger compartment of the vehicle. The igniter tube advantageously does not act as a heat sink to reduce heat transfer between the burning igniter charge and gas generant, since the walls of the igniter are consumed and vanish almost instantaneously upon ignition of the igniter charge. The igniter tube, accordingly, does not confine the solid burning particulates generated from the ignited igniter charge, thereby allowing for even more effective heat transfer from the ignited igniter to the solid fuel gas generant.

24 Claims, 3 Drawing Sheets

AIRBAG INFLATOR WITH CONSUMABLE IGNITER TUBE

This application is related to commonly assigned U.S. patent application Ser. No. 08/392,578, filed on Feb. 23, 1995, entitled "Linear Igniters For Airbag Inflators", now U.S. Pat. No. 5,626,360.

FIELD OF THE INVENTION

The present invention relates to gas generators or inflators that produce gases for such purposes as to rapidly inflate an inflatable passive vehicle occupant restraint cushion, more commonly known today as an "airbag", in the event of a vehicle collision. More particularly, the present invention relates to inflators that utilize the combustion of solid fuel gas generants, such as pyrotechnics, to generate a quantity of gases sufficient to rapidly inflate vehicle airbags located in the dashboard or instrument panel on the passenger side of the vehicle. The inflators of the present invention contain a consumable, thin-walled, metallic igniter tube filled with a primary solid fuel igniter charge that is used to ignite the solid fuel gas generant. The consumable igniter tube exhibits superior heat transfer properties and is a particularly effective replacement for the many igniter components conventionally found in passenger side solid fuel inflators, such as the non-consumable, perforated metallic igniter tube and the rapid deflagration cord that is crimped into an adapter and set inside the igniter tube along its length.

BACKGROUND OF THE INVENTION

Safety restraint systems which self-actuate from an undeployed state to a deployed state without the need for intervention by the operator, i.e., "passive restraint systems", and particularly those restraint systems incorporating inflatable cushions or bags, i.e., "airbags", have been devised for automotive vehicles to protect occupants in the event of a collision. In inflatable passive vehicle restraint systems, one or more airbags are normally stowed in covered storage compartments of the vehicle in an uninflated and folded condition. Upon actuation, the airbag breaks through the frangible cover of the storage compartment and is rapidly deployed in a matter of milliseconds into position in front of the vehicle occupant, i.e., driver and/or passengers, to cushion the occupant from injury-causing impact with the interior structure of the vehicle.

A driver side airbag for protecting the vehicle driver is usually mounted in a covered compartment on the hub of the steering wheel. An airbag for the protection of a front seat passenger, i.e., a passenger side airbag, is usually mounted in a covered compartment in the dashboard or instrument panel of the vehicle. Side impact airbags are now being mounted in compartments located in the side doors or seat backs of the vehicle for protection of an occupant from side collisions. All such airbags are housed in a deflated and folded condition to minimize space requirements. Mounted in close conjunction with the airbags are the necessary elements to cause rapid inflation and deployment upon actuation by a crash sensor. A crash sensor is generally positioned about the frame or body of the vehicle, and sends an electric activation signal to the inflation elements after it detects a sudden deceleration by the vehicle, as would occur in a collision.

A number of inflation devices, commonly referred to as "gas generators" or "inflators", are known for inflation of airbags in a vehicle. In one device, known as an inert gas inflator, a folded airbag is inflated by ambient gas supplied from a container charged with a pressurized supply of inert gas, such as argon. In another device, known as a pyrotechnic or solid fuel inflator, a quantity of gas sufficient to inflate the airbag is rapidly generated from ignition of a solid pyrotechnic material. Pyrotechnic inflators can be found in driver side, passenger side, and side impact airbag inflatable restraint systems. A third type of device, known as a hybrid inflator, derives a hot inflation gas from a combination of stored compressed inert gas, such as argon, and ignition of a gas-generating material, such as a solid pyrotechnic material. In those inflators using solid pyrotechnics, an igniter is required to ignite the pyrotechnic and thereby initiate the rapid generation of the inflation gases for inflation and deployment of the airbag.

Igniters may take a number of forms dependent on the specific gas generation device and the particular gas generant composition utilized. One form of igniter used in a passenger side pyrotechnic inflator is described in U.S. Pat. No. 4,005,876 to Jorgensen et al. The igniter includes a perforated, non-consumable, steel igniter tube filled with a primary pyrotechnic igniter charge composed of a granular mixture of 25 wt. % boron and 75 wt. % potassium nitrate ($BKNO_3$), an electric squib at one end of the tube, and a fuse set inside the igniter tube submersed in the charge. The igniter tube centrally extends along the active length of an elongated annular combustion chamber contained in a cylindrical inflator housing. Pellets of a solid pyrotechnic gas generant, such as a mixture of 55 wt. % sodium azide and 45 wt. % anhydrous chromic chloride, surround the central igniter tube in the combustion chamber. In operation, the electric squib fires and initiates burning of the fuse in the central igniter tube, thereby igniting the primary igniter charge. Once ignited, the primary igniter charge releases a flame of hot igniter gases out through the igniter tube perforations onto the solid pyrotechnic pellets for ignition. However, the burning solid igniter particulates are retained in the igniter tube. After ignition, the solid fuel pellets rapidly generate inflation gases which are first directed through cooling filters contained in an annular filter chamber surrounding the combustion chamber, and then out through diffuser exit ports formed in the housing for discharge into an airbag for inflation and deployment.

U.S. Pat. No. 4,200,615 to Hamilton et al. teaches a similar form of linear igniter housed in a passenger side pyrotechnic inflator.

A further light weight igniter for a light weight passenger side inflator is taught in U.S. Pat. No. 4,878,690 to Cunningham. The igniter used in this passenger side inflator comprises a relatively thin, i.e., less than 0.03 inch thick and equal to or greater than 0.02 inch, perforated, relatively non-consumable, 18 mesh tubular screen, preferably made from stainless steel in order to resist the heat of combustion of the igniter charge. A rapid deflagration cord (RDC) is provided in the center of the tube with granules of an igniter charge, such as a $BKNO_3$, surrounding it. The perforated igniter tube is covered with a frangible, adhesive backed, aluminum foil layer to keep the igniter powder or granules from coming through the igniter tube perforations. Foam plugs are press fit in the opposite ends to seal the tube. One end of the tube is located adjacent to an electric squib which initiates burning of the fuse and consequent combustion of the igniter material. The igniter tube is centrally disposed in a light weight, elongated annular combustion chamber that is contained within a light weight aluminum inflator housing. The igniter tube either extends through cores of stacked solid pyrotechnic gas generant wafers housed in the combustion chamber or is surrounded by randomly packet pellets of the solid pyrotechnic gas generant in the combustion chamber. In operation, an electric signal from a crash sensor is sent to the squib which fires to initiate burning of the fuse. The fuse burns down the center of the perforated igniter tube and effects combustion of the igniter charge. Then, only the hot gases from the burning pyrotechnic charge pass through the perforations in the igniter tube and burst through the aluminum foil to ignite the plurality of solid pyrotechnic gas generant wafers or pellets in the combustion chamber. The burning gas generant rapidly releases inflation gases which leave the combustion chamber and then pass through filter screens in an annular filter chamber surrounding the combustion chamber for cooling of the hot inflation gases and removal of particulate matter therefrom. The treated inflation gases are then discharged from the housing through diffuser exit ports formed in the exterior wall of the housing into an airbag.

U.S. Pat. No. 4,890,860 to Schneiter teaches a passenger side inflator device having another linear igniter. The igniter comprises an elongated, perforated steel igniter tube, longitudinally extending along the length of the combustion chamber, which is surrounded by a thin, frangible layer of aluminum foil. The igniter tube is filled with pyrotechnic igniter granules and a RDC or fuse submersed therein. This igniter tube is likewise not consumed upon ignition.

The various igniters found in the prior pyrotechnic inflators, as described above, are all made from relatively non-consumable materials that are generally able to withstand the heat of combustion of the pyrotechnic igniter charge contained therein during inflator activation. Moreover, the non-consumable materials are often formed into perforated steel tubes that must extend longitudinally along the entire length of the combustion chamber to be effective and provide for even ignition throughout the active length of the inflator. The prior igniters often require as well a RDC or fuse, typically having a high flame propagation rate (i.e., about 680 to 1,200 ft/s), set inside the igniter tube along its length and submersed in the pyrotechnic igniter charge granules. This igniter construction has been found satisfactory for completely igniting the primary igniter charge and also for providing sufficient high temperature impingement of the hot gases produced from the burning igniter charge onto the solid pyrotechnic gas generant, along the entire length of the combustion chamber, for completely igniting the gas generant. Many variations of these prior linear igniters are presently in use and work well for activating pyrotechnic inflators. However, the prior igniters also have their drawbacks.

In particular, the prior igniters are comprised of many components, some of which are costly, and require labor intensive assembly. Accordingly, the prior igniters are relatively expensive to make and hard to install. And once assembled these igniters having many parts are more difficult to inspect for defects. Additionally, the prior igniters are disadvantageously composed of relatively non-consumable, perforated, igniter tubes that are made of a steel construction. In operation, the non-consumable steel tubes undesirably act as a heat sink, cooling the hot igniter gases as they exit the perforations. Consequently, the heat transfer from the igniter to solid fuel gas generant is lessened. Moreover, the non-consumable nature of the steel igniter tube further reduces the igniter's heat transfer properties by essentially dispersing only the hot igniter gases into the combustion chamber, while simultaneously confining and preventing the remainder of the igniter charge combustion products, including the hot burning solid igniter particulates, from venting through the perforations and spreading throughout the combustion chamber, thus, failing to make direct contact with the gas generant. The reductions in heat transfer that result from the use of a relatively non-consumable perforated igniter tubes render the prior igniters less effective.

What is needed is an igniter for inflators, preferably solid fuel inflators, used in passive vehicle inflatable restraint systems, that is easy and inexpensive to manufacture, assemble and install, is less complicated in construction and contains fewer parts to inspect, and is made of consumable components in order to increase, upon ignition, the heat transfer communication from the igniter to the gas generant.

SUMMARY OF THE INVENTION

It is an object of the present invention to provide a new and improved igniter for an inflator used in a passive vehicle inflatable airbag restraint system which meets the needs of igniting a gas generant without suffering from the foregoing disadvantages.

It is another object of the present invention to provide a new and improved igniter that is simpler in construction than prior igniters.

It is yet another object of the present invention to provide a new and improved igniter that is less expensive to manufacture and easier to assemble, install and inspect than prior igniters.

It is still another object of the present invention to provide a new and improved igniter that, when ignited, increases the heat transfer from the igniter to the solid gas generant and is, accordingly, more reliable in performance than prior igniters.

It is a further object of the present invention to provide a new and improved igniter from components which are consumed when ignited, thereby improving heat transfer from the igniter to the gas generant.

It is a related object of the present invention to provide a new and improved airbag inflator that contains the aforesaid new and improved igniter.

It is still another object of the present invention to provide a new and improved passenger side solid fuel pyrotechnic inflator that contains the aforesaid new and improved igniter for igniting the solid pyrotechnic gas generant which, upon ignition, produces hot inflation gases that exit into and inflate a vehicle inflatable restraint cushion associated therewith.

These and other objects are achieved by the present invention in a first aspect by providing a new and improved igniter used for inflating an inflatable cushion or airbag which is characterized by: an elongated igniter enclosure for containing an igniter charge, with the enclosure being made of a consumable metallic material; an igniter charge confined within the enclosure; and, an initiator for igniting the igniter charge, in which the confining walls of the enclosure are consumed almost instantaneously upon ignition of the igniter charge to provide at least one opening in the enclosure for venting therefrom essentially all ignition products of the igniter charge, including both hot gases and hot burning solid particulates, to initiate inflation of the inflatable cushion. The consumable igniter of the present invention is simpler in construction and has superior heat transfer properties than prior igniters.

In this version, it is preferred that the consumable enclosure is in the form of an elongated consumable tube closed at one end by a consumable end wall and closed at the opposite end by the initiator. The consumable tube and end wall are preferably made of a thin consumable aluminum foil construction, in which the aluminum foil has a wall thickness of preferably less than about 0.02 inch, and even more preferably between about 0.002 and about 0.015 inch. It is also preferred that the consumable tube walls at least partly, but even more preferably completely, vanish almost instanteously upon ignition of the igniter charge. The igniter charge is preferably composed of a solid pyrotechnic material. In addition, a fuse or RDC is not required.

The aforesaid and other objects are achieved by the present invention in a second aspect by providing a new and improved inflator for inflating an automotive airbag, preferably a passenger side airbag, which is characterized by: an elongated generally cylindrical housing having a closed first end and an opened second end; a centrally disposed igniter closing the second end of the housing, the igniter characterized by an elongated igniter tube composed of a thin consumable metallic material, for example, aluminum, preferably having a wall thickness less than about 0.02 inch, preferably ranging between about 0.002 and about 0.015 inch, longitudinally extending within the housing a distance from the second end towards the closed first end, the consumable igniter tube having a closed first end facing the closed first end of the housing and an opposite opened second end, the second end of the igniter tube being closed by electric initiator or squib, the consumable igniter tube further having an igniter charge confined therein, preferably a solid pyrotechnic material; an elongated generally annular combustion chamber extending essentially along the length of the housing and generally surrounding the igniter and in flow communication therewith, the combustion chamber containing a gas generant, preferably a solid pyrotechnic material; an elongated generally annular gas filter chamber generally surrounding the combustion chamber and in flow communication therewith, the gas filter chamber containing one or more filters; and, a gas diffuser outlet disposed on a selected portion of the housing for directing generated inflation gases from the filter chamber out of the housing for inflating an automotive airbag associated therewith, in which the consumable igniter tube is partially or fully consumed upon ignition of the igniter charge to provide at least one opening in the igniter tube for transferring substantially all ignition products of the burning igniter charge, including both hot gases and burning solid particulates, into the combustion chamber. The consumable igniter in the airbag inflator of the present invention is simpler in construction and has superior heat transfer properties than prior igniters.

Other objects, features and advantages of the present invention will become more apparent from the following description and the appended claims.

BRIEF DESCRIPTION OF THE DRAWINGS

With this description of the invention, a detailed description follows with reference to the drawings, in which like reference numerals denote like elements, and in which.

It should be understood that there are shown in the aforesaid drawings certain exemplary embodiments of the invention as presently preferred. The invention is not limited to these embodiments and is capable of variation within the spirit and scope of the appended claims.

DETAILED DESCRIPTION OF THE PREFERRED EMBODIMENTS OF THE INVENTION

Figures 1, 2:
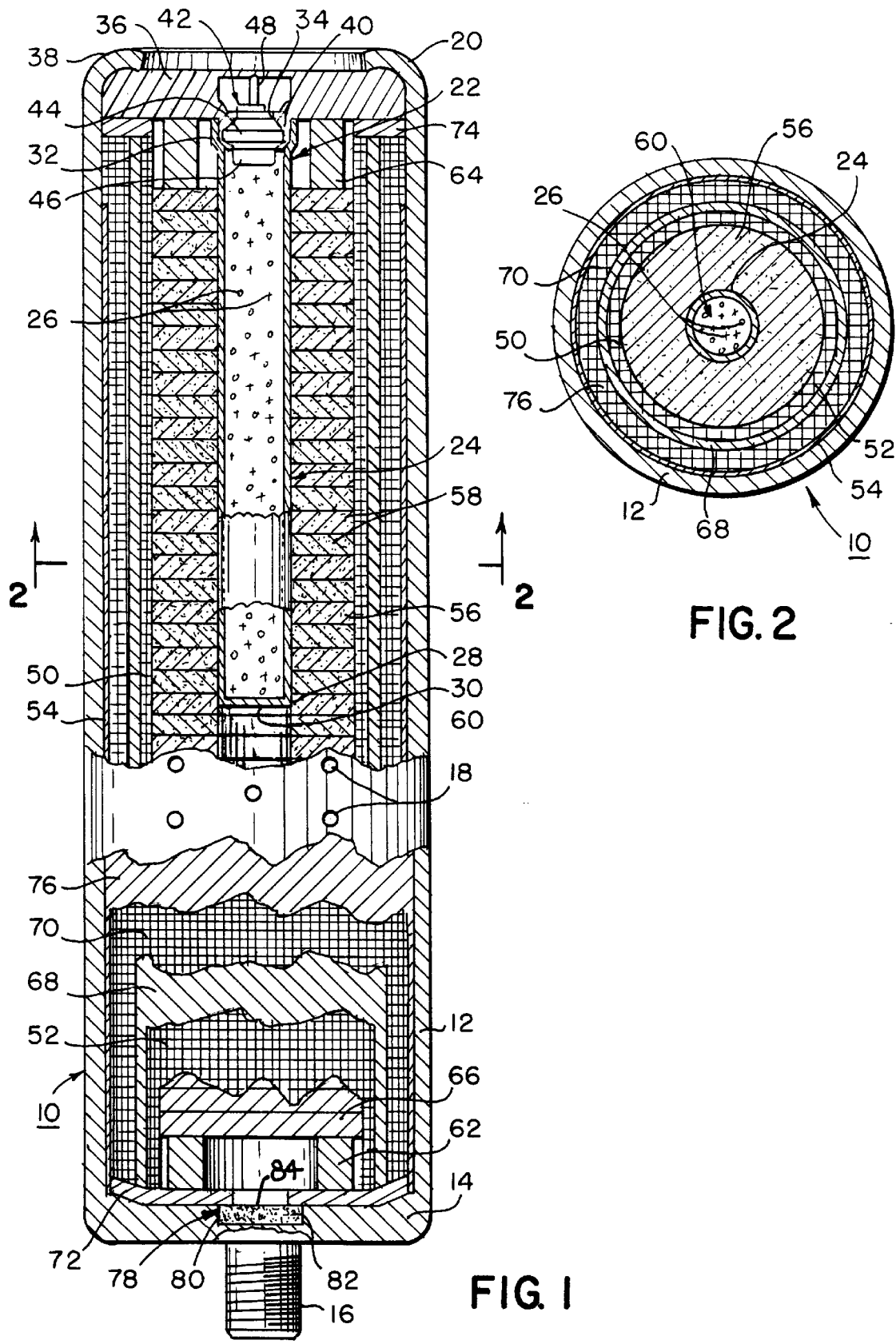
FIG. 1 is a side view, partly in section, of an airbag inflator incorporating an embodiment of a consumable igniter in accordance with the present invention.
FIG. 2 is a cross-sectional view of the airbag inflator of FIG. 1 taken along lines 2—2 thereof.

Referring now to the drawings of FIGS. 1 and 2, there is shown a gas generator or inflator 10 which may be used to inflate vehicle passive restraint inflatable airbags located, for instance, on the passenger side of a vehicle. It should be understood, however, that the inflator can also be configured to inflate side impact and driver side airbags as well. The inflator 10 includes an elongated generally cylindrical housing 12, preferably being made of lightweight aluminum having a thickness adequate for withstanding inflation gas pressures. One end 14 of the housing 12 is closed and includes a threaded pin 16 longitudinally extending therefrom which may be used to attach the inflator to the reaction canister (not shown) that is, for instance, mounted behind the dashboard (not shown) or instrument panel (not shown) on the passenger side of the vehicle, as is well known in the art. The housing 12 includes a diffuser comprising a plurality of diffuser outlet orifices or ports 18 spaced longitudinally along the length thereof and circumferentially over an arc portion thereof for the release of generated inflation gases at the desired gas flow rate out from the inflator 10 into the open mouth of a vehicle airbag (not shown) which is suitably attached thereto, as is well known in the art.

Centrally disposed in the housing 12 and longitudinally extending from the second end 20 of the housing 12 along a selected length thereof is a consumable igniter assembly 22. The igniter 22 can longitudinally extend along the entire length of the housing 12. However, due to its improved heat transfer properties in the present invention, the igniter 22 does not have to extend along the entire length of the housing. As shown in a preferred embodiment in FIG. 1, the igniter 22 extends from the second end 20 to about half the length of the housing 12. The consumable igniter 22 comprises a generally cylindrical igniter tube 24 fabricated from a consumable material that is more fully described hereinbelow. The igniter tube 24 houses granules of a primary igniter charge 26 which generally fill the unoccupied space inside the consumable tube.

One end 28 of the igniter tube 24 is closed by an end wall 30. As shown in FIG. 1, the end wall 30 is formed integral with the igniter tube. The end wall 30 may also be a separate consumable end plug as will be discussed hereinbelow. The second end 32 of the igniter tube 24 is sealingly secured around a central opening 34 formed in the second end 20 of the housing 12. As shown, the second end 20 of the housing 12 includes an annular end cap 36 having the central opening 34 formed therein. The annular end cap 36, preferably being made of lightweight aluminum, is attached to the inside of the housing 12 through swaging, thereby forming a swage stake 38. Of course, inertia welding could likewise be used to attach the end cap 36 to the housing 12.

Extending longitudinally inward from the central opening 34 in the end cap 36 is a thin cylindrical extension wall portion 40 which is an integral part of the end cap 36. The cylindrical wall 40 defines a mounting flange that is used to retain a standard electric squib or initiator 42 positioned in the central opening 34. The squib 42 is sealing mounted in the cylindrical wall 40, thereby closing the opening 34 and hermetically sealing the second end 20 of the housing 12 against entry of outside contaminants. As shown, the cylindrical wall 40 is deformed or crimped downwardly and radially inwardly to overlie an enlarged body portion 44 of the squib 42 that is located at the base of an aluminum cylindrical cup portion 46 which houses the ignitable squib charge (not shown). The squib 42 can otherwise be retained in the cylindrical wall 40, for example, by being threadedly secured thereto or slip fitted therewithin.

The second end 32 of the igniter tube 24 is then secured around the cylindrical wall extension portion 40 in order to close the second end 32 of the igniter tube 24 around the squib 42. In the embodiment shown in FIG. 1, the second end 32 of the igniter tube 24 is fitted over the outer periphery of the cylindrical wall 40, which causes the second end 32 to slightly deform radially outward over the cylindrical wall 40, forming a press-fit engagement. It is also possible to threadedly or otherwise secure the second end 32 of the igniter tube 24 to the cylindrical wall 40. In this embodiment, the squib 42 closes the second end 32 of the igniter tube 24, so that the squib is disposed in direct contact with the igniter charge granules 26 contained in the igniter tube. Of course, the second end 32 can be closed, with the squib being located in heat transfer relation adjacent to the closed end as well.

The squib 42 is also connected to a pair of electrical lead pins 48 which extend longitudinally outward from the second end 20 of the housing 12. Inside the squib (not shown), the electrical lead pins 48 are bridged together by a resistance wire (not shown) that is embedded in a pyrotechnic charge (not shown), for example, lead styphnate granules, filling the interior of the cylindrical cup 46, as is well known in the art. The electrical lead pins 48 are suitably connected to a standard vehicle crash sensor circuit (not shown) which sends an electric activation signal to the squib 42 to fire the squib charge at the onset of a vehicle collision, as is well known in the art.

Referring still to FIG. 1, the consumable igniter 22 of this invention is composed of an elongated igniter tube or shell 24 that is made from a consumable material, preferably a thin metallic material, which can be filled with the primary igniter charge 26. The term "consumable" as used herein means any material that can be formed initially into a self-supporting structure for housing an ignitable charge and that can subsequently be rapidly burned or gasified, preferably into relatively non-toxic by-products, from the heat and/or flame of the burning ignitable charge, such that the walls of the self-supporting structure are devoured thereby and vanish, at least in part, forming one or more openings in the enclosing structure to allow the burning charge contained therein to pass, substantially unobstructedly, therefrom. In other words, the consumable material forming the igniter tube 24 must have enough structural strength to provide a self-supporting walled enclosure for housing the primary igniter charge granules 26. And the consumable material of the igniter tube 24 must also have the ability to be rapidly consumed, preferably being fully consumed, upon ignition of the primary igniter charge 26, causing preferably all of the containment walls of the igniter tube 24 to almost instantaneously disappear, thereby exposing the entire burning contents of the igniter tube to a gas generant, preferably a solid fuel gas generant, disposed within the inflator housing adjacent to and in direct heat transfer relation with the igniter tube 24, as more fully described hereinbelow.

In this manner, virtually all of the burning contents contained in the igniter tube that are generated from the ignited igniter charge 26, including hot gases as well as hot burning solid particles, are allowed to escape through the consumed and opened igniter tube walls and make direct thermal contact with the solid fuel gas generant for more effective ignition thereof Moreover, since the igniter tube 24 disintegrates upon ignition, it does not act as a heat sink. As a result of the combination of hot solid particulates of the igniter material 26 now reaching the gas generant and the elimination of the igniter tube 24 as a heat sink through consumption, the heat transfer from the igniter 22 to the gas generant is substantially improved.

The consumable igniter tube 24 of this invention is preferably made of thin aluminum. The term "thin" as used herein is meant to refer to a thickness that will yield a "consumable" structure, and, preferably, that which is less than about 0.02 inch thick, even more preferably that which is less than about 0.015 inch thick, and, most preferably, that which is between about 0.002 and about 0.015 inch thick. Walls that are less than about 0.002 inch thick are generally unworkable. The aluminum used to construct the igniter tube 24 can be provided in preformed foil, shim, thin strip, or sheet form, but it can also be provided in ingots that require subsequent forming. Other consumable materials which do not produce toxic ignition products as well, such as thin shims, strips, sheets, foil, or ingots of metal, steel, and other alloys, or the like, can be used instead to form the igniter tube, although aluminum foil is most preferred. It is also possible to form the igniter tube from thin paper shims, strips, sheets, or the like, or nitrocellulose extrudates, although these are generally less preferred.

The consumable igniter tube 24 of this invention can be produced by conventional forming methods, such as by molding into tubular form having either an opened end and a closed end or two opened ends, extruding into tubular form having two opened ends, or by rolling and/or folding a shim, sheet or strips of the consumable material into tubular form having either an opened end and a closed end or two opened ends and holding it in such form by further bending, folding, or rolling along the end or longitudinal seam, or the use of suitable heat treatment or adhesives, or other like methods. Since the end wall 30 of the igniter tube 24, opposite the open end 32 closed by the squib 40, should be closed, it can be closed either by molding a consumable end wall integral with the consumable side walls, folding over a free end or ends of the side walls across the opening and securing the folded over portion or portions by further bending, folding, rolling, or the use of suitable heat treatment or adhesives, tapering the side walls and maintaining the tapered portions together in the same manner, or by plugging the opened end with a suitable thin consumable end cap having similar properties to that of the consumable side walls.

In the embodiment of FIG. 1, the igniter tube 24 is made by rolling a thin consumable sheet of aluminum about a longitudinal axis to form an opened ended cylindrical tube having cylindrical side walls. The joined opposite sides of the sheet are then secured together along the longitudinal seam by application of suitable heat treatment or adhesives. Next, a free end of the cylindrical sidewalls at one of the opened ends is suitably folded across the opened end in order to close this end. The folded over portion is then be held in position by suitable heat treatment or adhesives to form an integral consumable end wall.

The consumable igniter tube 24 can, thus, be simply constructed with minor manipulations into a generally cylindrical tube having a closed end wall 30 formed integrally with the depending cylindrical side walls. Further, due to increased heat transfer effects resulting from the use of a consumable material, the consumable igniter tube 24 formed need not extend along the entire length of the housing 12. Accordingly, as shown in FIG. 1, the igniter tube 24 can extend along a shortened distance within the housing from the second end 20. This further simplifies the construction and installation of the igniter and also reduces cost, yet it does not sacrifice igniter performance.

Contained within the igniter tube 24 is a suitable primary igniter charge 26, that is preferably a solid pyrotechnic gas generant composition, which meets the requirements for rapid ignition, flame temperature, and non-toxic ignition products. The solid pyrotechnic igniter material 26 can be provided in a variety of forms, including finely divided granules, fibers, or unitary shaped solids. A suitable solid pyrotechnic igniter material that can be used is a granular mixture of 25 wt. % boron and 75 wt. % potassium nitrate ($BKNO_3$).

In the present invention, a fuse or rapid deflagration cord (RDC) is not required to be set inside the consumable igniter tube 24 of the present invention. In this case, the assembly and inspection of the igniter is simplified inasmuch as the fuse can be eliminated therefrom. The number of igniter parts and thus its cost are also reduced. Surprisingly, the time delays for this fuseless consumable igniter 22 has been acceptable in practice. The inventors have not hitherto been able to produce a linear igniter with acceptable time delays without including the RDC cord. However, it should be understood that a fuse (RDC), although not preferred, can be included within the igniter tube 24.

Additionally, since the igniter tube 24 is essentially fully consumable upon ignition, perforations in the igniter tube, which had been used in the past to allow the hot igniter gases to exit into the solid fuel gas generant, are not required. Consequently, the frangible seal, such as a layer of aluminum foil, which had been used in the past to cover the tube perforations in order to confine the igniter charge inside a perforated igniter tube until ignition, is also not required in the igniter assembly 22 of the present invention. The fabrication and assembly of the igniter 22 is further simplified thereby, and the cost is reduced.

It should be understood, however, that perforations can be formed along the length of the igniter tube 24, if desired, to define areas of reduced cross-section which may enhance the burn through properties of the tube walls. If perforations are used, orifices having a size smaller than that of the igniter granules 26 are most preferred for retaining a significant portion of the igniter charge 26 within the igniter tube 26. Likewise, a frangible layer of aluminum foil can be adhesively secured to the inner or outer walls of a perforated igniter tube across the perforations to initially seal the tube.

Referring again to FIGS. 1 and 2, the initially intact, and preferably sealed, consumable igniter assembly 22 is centrally placed within an annular combustion chamber 50 which longitudinally extends substantially along the length of the housing 12. A tubular screen 52, composed of coarse metal screen, generally surrounds the combustion chamber 50 along the length thereof. The tubular screen 52 divides the interior of the housing 12 into two distinct chambers, namely the combustion chamber 50 and an annular filter chamber 54 which generally surrounds the combustion chamber. It should be understood that it is also possible to use a perforated tubular metal basket (not shown), typically composed of steel, having perforations formed along its length, instead of the tubular screen 52, as is well known in the art.

The gas generant 56 that produces the inflation gases is also located in the combustion chamber 50. The gas generant 56 is most preferably a solid fuel gas generant composition, such as a solid pyrotechnic material. The solid fuel gas generant 56 can be any one of a number of solid pyrotechnic compositions that meet the requirements of suitable burn rate, gas production, non-toxicity, and flame temperature. Suitable solid pyrotechnic compositions, including sodium azide and non-azide based solid pyrotechnic compositions, that can be utilized include, without limitation, those described in U.S. Pat. No. 4,203,787 to Schneiter et al., U.S. Pat. No. 4,639,079 to Shaw, U.S. Pat. No. 5,443,286 to Cunningham et al., and U.S. Pat. No. 5,538,568 to Taylor et al., which disclosures are incorporated by reference herein in their entireties. The solid fuel gas generant 56 can be provided in the form of randomly packed, pressed tablets or pellets (not shown), extruded multi-lobed unitary bodies (not shown), or annular wafers 58 stacked in an array one on top of the other. Particularly preferred profiled geometries for such solid pyrotechnic gas generant wafers, along with a variety of azide or non-azide formulations therefor, are disclosed in U.S. Pat. No. 5,551,343 to Hock et al., which disclosure is incorporated by reference herein in its entirety.

As shown in the embodiment of FIGS. 1 and 2, the solid fuel gas generant 56 comprises a plurality of wafers 58 which are stacked one on top of the other, as is well known in the art. The wafers 58 preferably have a profiled surface (not shown) and are stacked in a manner that prevents them from wearing against each other or from being fractured or otherwise damaged in the event of vibration, shock, or thermal expansion in the automobile environment, as is well known in the art. The stacked wafers 58 are also provided in washer-shaped disc form, each wafer having a central cavity 60 extending therethrough. The outer diameter of the washer-like pyrotechnic members, as shown, is slightly smaller than the outer diameter of the annular combustion chamber 50. Although, the dimensions of the wafers 58, e.g., thickness, inner diameter, outer diameter, and overall length, can vary widely.

The stacked solid fuel gas generant wafers 58 are disposed in the combustion chamber 50 and longitudinally extend substantially over the active length thereof. Resilient spaces 62 and 64 are placed at opposite ends of the overall wafer stack to interferencly retain the wafers against the opposite end walls of the inflator housing 12. The overall wafer stack can be enclosed in a layer of aluminum foil 66 to provide the wafer stack in a pre-assembled form prior to assembly into the inflator 10, which further prevents movement and breakage of the individual wafers. The wafers can also be stacked individually in the combustion chamber without using an aluminum jacket.

As shown in FIGS. 1 and 2, located within the central cavity 60 of the stacked gas generant wafers 58 is the consumable igniter tube 24. The igniter tube and the central cavity have a complementary shape, so that the igniter tube can be suitably disposed within the cavity. As shown, the igniter tube 24 is inserted in the central cavity 60 having a diameter that is slightly larger than the outer diameter of the igniter tube. The gas generant wafers 58 generally extend radially outward from the igniter tube 24 to effectively fill the combustion chamber 50.

Further in the embodiment shown in FIGS. 1 and 2, the tubular screen 52 dividing the combustion chamber 50 and filter chamber 54 forms part of a filter pack or screen pack assembly that surrounds the combustion chamber 50 and is used to treat the generated inflation gases before exiting the inflator. A filter pack typically includes superimposed layers of coarse and/or fine metal screens and/or ceramic filter papers, as is well known in the art. Accordingly, generally surrounding the coarse tubular screen 52 is a tubular filter paper layer 68. The filter paper 68 is preferably composed of ceramic fibers. Generally surrounding the filter paper 68 is a tubular fine metal screen 70, thereby completing the filter pack assembly.

Generated inflation gases are, thus, led from the combustion chamber 50 through perforations in the tubular screen 52 into the filter chamber space 54 between the screen 52 and the interior side wall of the housing 12 before they are discharged through the diffuser 18 in the inflator housing 12 into the airbag. The filters 52, 68 and 70 serve both as a heat sink, cooling the hot inflation gases as they pass therethrough, and as a filter to remove particulates from the gas stream. Such particulates can result from degradation of the gas generant wafers caused, at least in part, by the flow of the initially generated gases through the yet unconsumed gas generant particles as such gases pass through the perforations in the exterior wall 52 of the combustion chamber. Further particulates can also result from the partial deterioration and fragmentation of the structural components used within the combustion chamber, such as fragments of the igniter tube and the squib initiator. The filters 52, 68 and 70 effectively ensure that such particulates and fragmented inflator internal parts do not exit into the airbag and cause catastrophic airbag failure.

Annular seals 72 and 74 composed of high temperature resistant, resilient sealing materials are positioned between opposite ends of the filters 52, 68 and 70 and the inner side of the opposite end walls of the housing 12 to prevent blow by of the filters as the generated gases move radially outward from the combustion chamber 50 towards the diffuser exit orifices 18.

As discussed previously, suitably spaced over the length of the housing 12 and over a portion thereof circumferentially is a plurality of diffuser outlet orifices or ports 18 for release of the generated gas at the proper flow rate from the filter chamber 54 into the associated airbag. It should also be understood that other well known types of diffusers can likewise be used to throttle the inflation gases out from the inflator housing into the airbag.

Also, in the inflator 10 shown in FIGS. 1 and 2, a thin frangible seal 76, such as a layer of aluminum foil, is adhesively secured to the inner side of the cylindrical side wall of the housing 12 extending across the diffuser exit orifices 18 to provide a hermetic seal that prevents entry of outside contaminants into the filters or other interior components within the sealed housing 12. Upon inflator activation, the seal 76 is designed to rupture when the generated inflation gases, that are produced upon ignition of the solid fuel gas generant wafers 58, attain a pressure that exceeds the structural capability of the seal 76, allowing the inflation gases to exit the inflator through the diffuser exit orifices 18.

The inflator 10 may also include an auto ignition device 78 centrally located inside the closed end 14 of the housing 12. The auto ignition device 78 is a well known safety feature used in inflators that is activated in the event of a car fire or other abnormal very high temperature conditions in the vehicle. Upon activation, the auto ignition device provides enough heat and/or flame to ignite the primary igniter charge 26 in the igniter tube 24 and discharge the inflator at much lower temperatures (e.g., about 350° F.) than the auto ignition temperature of the igniter charge 26 (e.g., about 650° F.). This prevents the aluminum of the housing 12 from being weakened, which would occur upon exposure to elevated temperatures around the auto ignition temperature of the igniter material. When in a weakened state, the housing 12 tends to easily burst and send flying fragments of the casing possibly into the vicinity of a by-standers.

The auto ignition device 78 includes an auto ignition cup 80 filled with an auto ignition material 82 covered by a frangible disc seal 84, such as adhesive backed aluminum foil. The auto ignition material 82 can be composed of a nitrocellulose composition, such as IMR by Dupont, which is stable for about ten years or more at temperatures up to about 250° F. but will ignite at about 350° F. As shown in FIG. 1, the auto ignition device 78 is located at the closed end 14 of the housing facing the igniter tube 24. Of course, the auto ignition device can be relocated in a position that is in closer proximity to the truncated igniter tube 24, as well.

The inflator 10 of this invention can be easily assembled by loading the aforesaid components in their proper positions within the elongated housing 12 and then swaging the free end portion of the second end 20 of the housing radially inward over the annular end cap 36 to seal off the opened end 20 and secure the annular end cap and all of the loaded components in place.

The inflator 10 operation begins with the sending of an electrical activation signal from a crash sensor through the leads 48 to activate the squib 42. The squib 42 fires causing the cylindrical cup 46 containing the ignited squib charge to rupture, which, in turn, initiates combustion of the primary pyrotechnic igniter charge 26 within the igniter tube 24. The igniter charge combustion products, including both hot gases and hot burning solid particulates, next cause the thin walls of the igniter tube 24 to become rapidly consumed and almost instantaneously vanish, at least partly, but preferably completely, thereby forming one or more openings in the thin walls of the igniter tube to allow the complete igniter tube contents, including both the hot gases as well as the hot burning solid particulates, to exit the consumed igniter tube.

The hot igniter combustion products are then caused to make direct contact with the solid fuel gas generant wafers 58 in the combustion camber 50, which, in turn, ignites the wafers 58. The ignited wafers 58 rapidly produce inflation gases in sufficient quantities to adequately inflate the airbag. The inflation gases first rupture the metal foil layer 66 over the wafers and then are directed to rapidly flow outward in a radial direction through the multi-layer filters 52, 68 and 70 for cooling of the gases and removal of particulate residues therefrom. The inflation gases next rupture the metal foil seal 76 and pass rapidly outward through the diffuser exit ports 18 into the open mouth of the associated airbag for rapid inflation and deployment.

Figure 3:
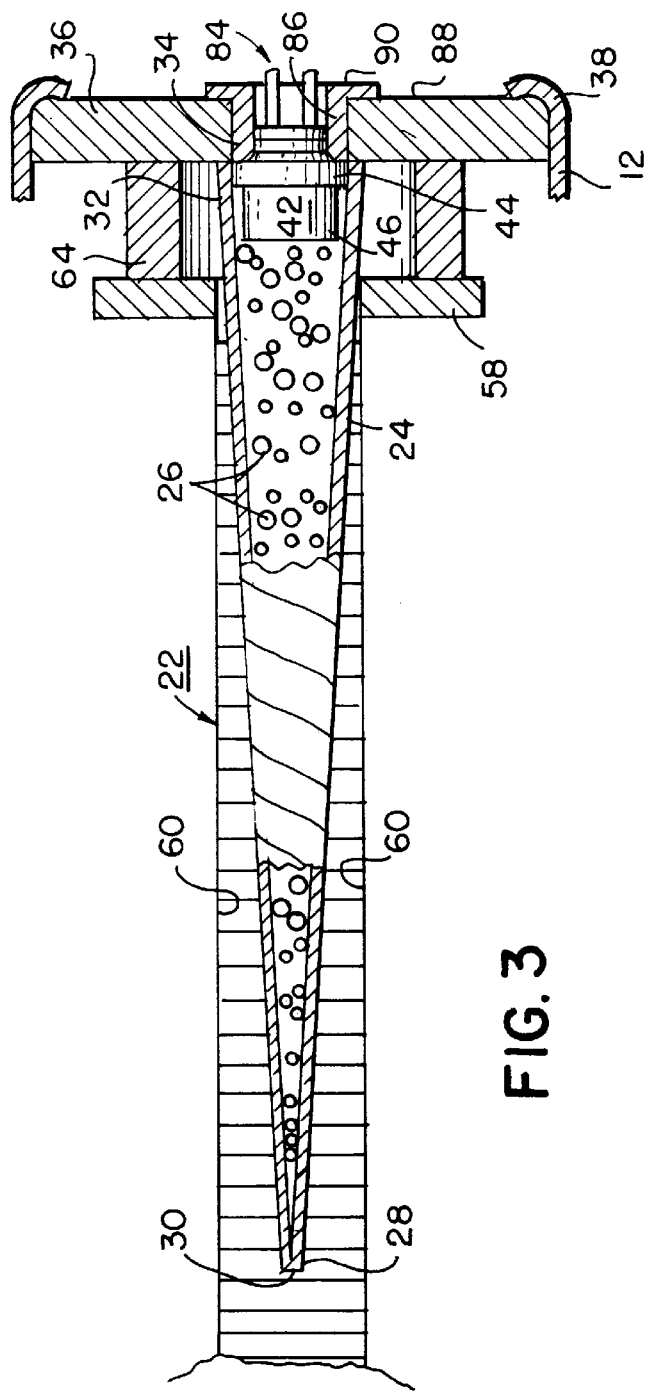
FIG. 3 is an enlarged view, partly in section, of another embodiment of a consumable igniter that can be used in the airbag inflator of FIG. 1.

Referring now to FIG. 3, in which the same reference numerals are used to denote like elements mentioned hereinabove, a second embodiment of a consumable igniter assembly 22 is shown which can be used in the inflator 10 in FIG. 1 in place of the cylindrical igniter assembly 22 as shown therein. The igniter 22 includes a generally conical shaped consumable igniter tube 24. The igniter tube 24 is preferably composed of thin spirally wrapped aluminum foil. The igniter tube 24 is formed by spirally wrapping the aluminum foil about itself in a longitudinal direction to form a conical shaped tube having an annular opened end 32 and a closed tapered end 28 that terminates in a point forming end wall 30. The end wall 30 remains closed by suitable heat treatment or use of adhesives. The consumable end wall 30 is, thus, formed integrally with the depending tapered side walls of the tube 24.

In this conical embodiment, the opened end 32 of the igniter tube 24 is closed by the electric squib 42. As shown, the cylindrical squib cup 46 is inserted within the opened end 32 of the tube until the enlarged body portion 44 of the squib engages the interior of the side walls of the tube 24 at the opened end 32, forming a press-fit, preferably sealed, engagement. It should be understood that the end 32 of the tube can also be threadedly, adhesively, or otherwise mounted to the enlarged squib body portion 44 as well. The squib 42 can then be sealingly mounted within the central cavity 34 of the annular end cap 36 with a separate annular mounting member 84 that surrounds the lower exterior base portion of the squib 42. The mounting member 84 is threadedly or otherwise secured within the cavity 34 and includes a cylindrical extension portion 86 that is slip fitted over, threadedly or otherwise attached to the base of the squib 42. The central cavity 34 is enlarged near its outlet to provide a shoulder 88 to engage an outer enlarged portion 90 of the mounting member 84.

Figure 4:
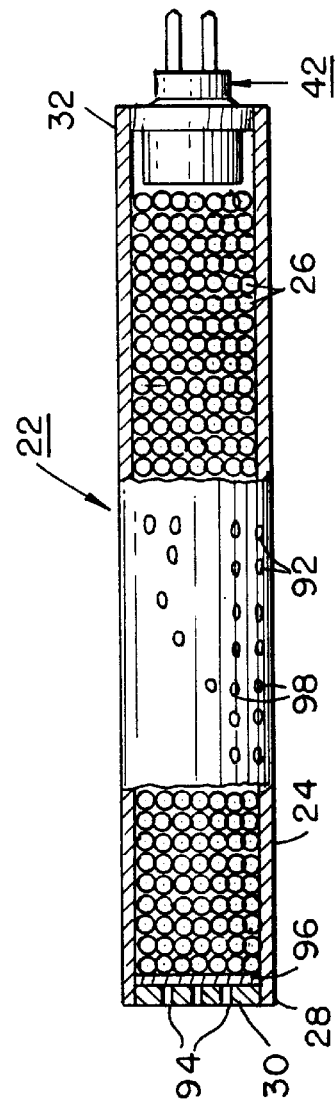
FIG. 4 is an enlarged view, partly in section, of another embodiment of a consumable igniter that can be used in the airbag inflator of FIG. 1; and, FIG. 5 is side view, partly in section, of an airbag inflator incorporating still another embodiment of a consumable igniter in accordance with the present invention.

Referring now to FIG. 4, in which the same reference numerals are used to denote like elements mentioned hereinabove, a third embodiment of a consumable igniter assembly 22 is shown which can also be used in the inflator 10 in place of the igniter assembly used therein. This embodiment includes a generally cylindrical shaped igniter 22 made from a thin walled aluminum tube 24 having two open ends 28 and 32. The tube 24 is closed at one end 32 by a squib 42 and closed at the opposite end 28 by a consumable end plug disc 30 that is composed of the same material as the igniter tube 24. The end plug 30 is retained between the cylindrical side walls at the end 28 of the igniter tube 24 by suitable heat treatment or the use of adhesives. The igniter tube 24 is again filled with a primary igniter charge 26.

The consumable tube 24 also includes perforations 92 spaced longitudinally along the length thereof and circumferentially over a selected arc portion to provide sections of reduced cross-section for even faster consumption of the tube 24. The end disc 30 also includes perforations 94 to assist in the operation of the auto ignition device 84 located in heat transfer relation to the end disc 30. As shown, the perforations 92 and 94 are preferably smaller than the igniter granules 26 to prevent the escape of a significant portion of the igniter granules 26 from the tube 24. Significant loss of igniter granules may cause a delay or possible malfunction of the inflator ignition system.

It is possible to seal the perforations with frangible layer of aluminum foil (not shown) adhesively secured across the perforations to the inner or outer side wall of the tube 24. Alternatively, a resinous membrane 96 can be adhesively attached to the inner surface of the end wall 30 or side wall of the tube 24 to respectively close off the perforations 94 or 92. The perforations 92 or 94 can also be closed by being filled or impregnated with a resin 98. The resinous material 96 and 98 should be formulated so as to not weaken significantly due to softening at temperatures which the vehicle may experience but will instantaneously burn away from the perforations in the flame front produced by the burning of the auto ignition material or the igniter granules. Such resins include polyesters, polyacrylates, polyethylene, polypropylene, and polyurethane, with a polyester film of Mylar being preferred as the resinous membrane and polyurethane being preferred as the impregnant, as taught in U.S. Pat. No. 5,427,030 to Kidd et al., which disclosure is incorporated by reference herein in its entirety.

In the embodiment of FIG. 4, the igniter tube is made by rolling a thin perforated consumable sheet of aluminum about a longitudinal axis and rolling the opposite ends of the tube over to maintain the sheet together. The joined together opposite sides of sheet forming the tube may also be folded over each along the longitudinal seam. The opened ended tube is next plugged at one end with a perforated consumable aluminum end disc having properties similar to that of the consumable tube.

Figure 5:
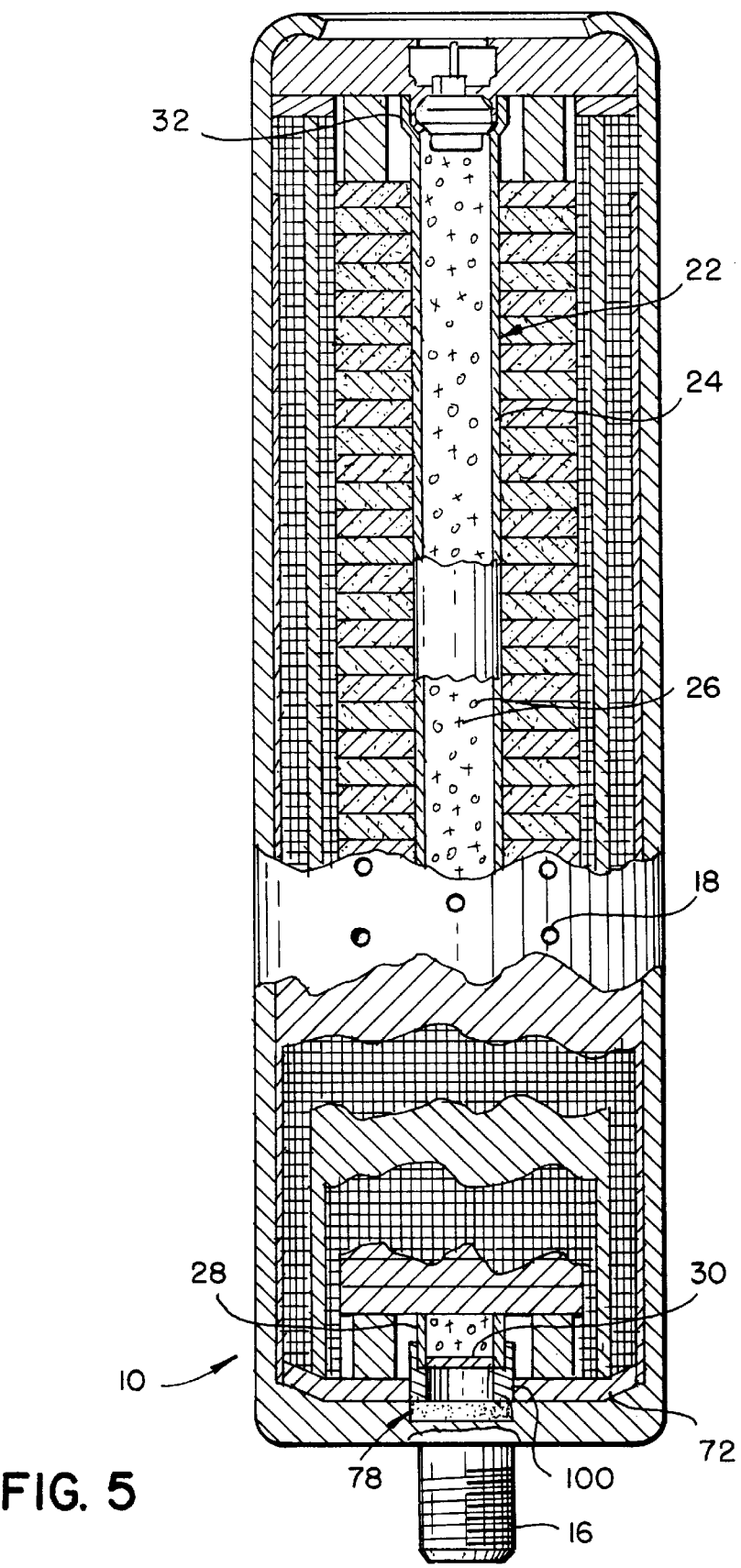

Another embodiment of the igniter assembly 22 is shown in FIG. 5 in which the same reference numerals are used to denote like elements mentioned hereinabove. In this embodiment, the igniter 22 includes a consumable igniter tube 24 that extends along the entire length of the combustion chamber 50. The igniter tube 24 is made by extruding aluminum into a thin consumable tube having two opened ends. A separate consumable end disc 30 is suitably bonded to the end 28 of the extruded tube 24 to close end 28. A cylindrical extension wall portion 100 is suitably mounted to or integrally formed in the annular end seal 72 to grip the exterior cylindrical side wall of the closed end 28 of the igniter tube 24. The end wall 30 is disposed within the extension wall portion 100 and faces the auto ignition device 78.

In summary, an improved igniter which is relatively simple in construction and convenient and inexpensive to produce and install in an airbag inflator is provided in this invention. The improved igniter allows for improved inflation of vehicle airbags as a result the improvement in the heat transfer communication from the igniter to the gas generant. The heat transfer, and thus, the overall igniter efficiency, is improved by allowing the distribution of all of the igniter charge combustion products, including the hot igniter gases as well as the hot burning solid igniter particulates, to enter into the combustion chamber through the consumable walls of the igniter tube, which are rapidly devoured and thus opened upon ignition of the igniter charge. Furthermore, with essentially no remaining igniter tube to act as a heat sink, the heat transfer is further enhanced. Moreover, the preferred embodiments which do not use a RDC or fuse in the igniter tube provide for a simpler igniter assembly and also provide diminished toxicity in the generated gases due to the elimination of lead that is usually present in the RDC. And the preferred embodiments which do not include the igniter tube longitudinally extending along the entire length of the housing provide for a simpler and less costly igniter.

From the foregoing it will be seen that this invention is one well adapted to attain all ends and objects hereinabove set forth together with the other advantages which are apparent and which are inherent to the structure. Since many possible embodiments may be made of the invention without departing from the scope thereof, the invention is not intended to be limited to the embodiments disclosed, which are considered to be purely exemplary and illustrative. Accordingly, reference should be made to the appended claims to assess the true spirit and scope of the invention, in which exclusive rights are claimed.

What is claimed is:

1. An igniter for use in a vehicle airbag assembly, which comprises:
    an elongated igniter enclosure for containing an igniter charge, said enclosure being made of a consumable metallic material;
    an igniter charge confined within said enclosure; and,
    an initiator for igniting said igniter charge,
    in which said enclosure is consumed upon ignition of the igniter charge to provide one or more openings in said enclosure for venting essentially all ignition products of the igniter charge therefrom.

2. The igniter of claim 1, in which said enclosure is essentially fully consumed upon ignition of said igniter charge.

3. The igniter of claim 1, in which said consumable metallic material is aluminum.

4. The igniter of claim 1, in which said enclosure has a wall thickness of less than about 0.02 inch.

5. The igniter of claim 1, in which said enclosure has a wall thickness of less the about 0.015 inch.

6. The igniter of claim 1, in which said enclosure has a wall thickness of between about 0.002 and about 0.015 inch.

7. The igniter of claim 1, in which said enclosure comprises annular elongated consumable tube having two opened ends, with one end being closed by a consumable end wall and the other end being closed by said initiator.

8. The igniter of claim 1, in which said consumable end wall is integral with the one end of the consumable tube.

9. The igniter of claim 7, in which said annular tube is generally cylindrical in shape.

10. The igniter of claim 7, in which said annular tube is generally conical in shape and tapers inward towards said consumable end wall.

11. The igniter of claim 1, in which said igniter charge is a solid pyrotechnic composition.

12. The igniter of claim 1, in which said igniter is disposed adjacent to an ignitable gas generant material that is contained in a housing of an inflator used for inflation of an inflatable cushion.

13. An inflator for inflating an automotive airbag, which comprises:

an elongated generally cylindrical housing having a closed first end and an opened second end;

a centrally disposed igniter closing said second end of said housing, said igniter comprising an elongated igniter tube composed of a consumable metallic material axially extending within said housing a distance from said second end towards said closed first end, said consumable igniter tube having a closed first end facing said closed first end of said housing and an opposite opened second end, said second end of said igniter tube being closed by electric initiator, said consumable igniter tube further having an igniter charge confined therein;

an elongated generally annular combustion chamber extending essentially along the length of said housing and generally surrounding said igniter in flow communication therewith, said combustion chamber containing a gas generant;

an elongated generally annular gas filter chamber generally surrounding said combustion chamber in flow communication therewith, said gas filter chamber containing one or more filters; and, a gas diffuser outlet disposed on a selected portion of said housing for directing generated inflation gases from said filter chamber out of said housing for inflating an automotive airbag, in which said consumable igniter tube is consumed upon ignition of the igniter charge to provide at least one opening in said igniter tube for transferring substantially all ignition products of the burning igniter charge into said combustion chamber.

14. The igniter of claim 13, in which said igniter tube is composed of a consumable metallic material is aluminum.

15. The inflator of claim 13, in which said igniter tube is essentially fully consumed upon ignition of said igniter charge.

16. The inflator of claim 13, in which said igniter tube extends within said housing from said second end a partial distance towards said first end.

17. The inflator of claim 13, in which said igniter tube extends within said housing essentially along the entire length thereof from said second end to said first end.

18. The inflator of claim 13, in which said igniter charge is a solid pyrotechnic composition.

19. The inflator of claim 13, in which said gas generant is a solid pyrotechnic composition.

20. The inflator of claim 13, in which said igniter tube is composed of consumable aluminum having a wall thickness of less than about 0.02 inch.

21. The inflator of claim 13, in which said igniter tube is composed of consumable aluminum having a wall thickness of less than about 0.015 inch.

22. The inflator of claim 13, in which said igniter tube is composed of consumable aluminum having a wall thickness of between about 0.002 inch and about 0.015 inch.

23. The inflator of claim 13, in which said igniter tube is perforated.

24. The inflator of claim 13, in which said igniter tube contains a rapid deflagration cord set inside the tube.

* * * * *